Feb. 28, 1950          G. FAST          2,499,093
COUPLING
Filed March 31, 1944          3 Sheets-Sheet 1
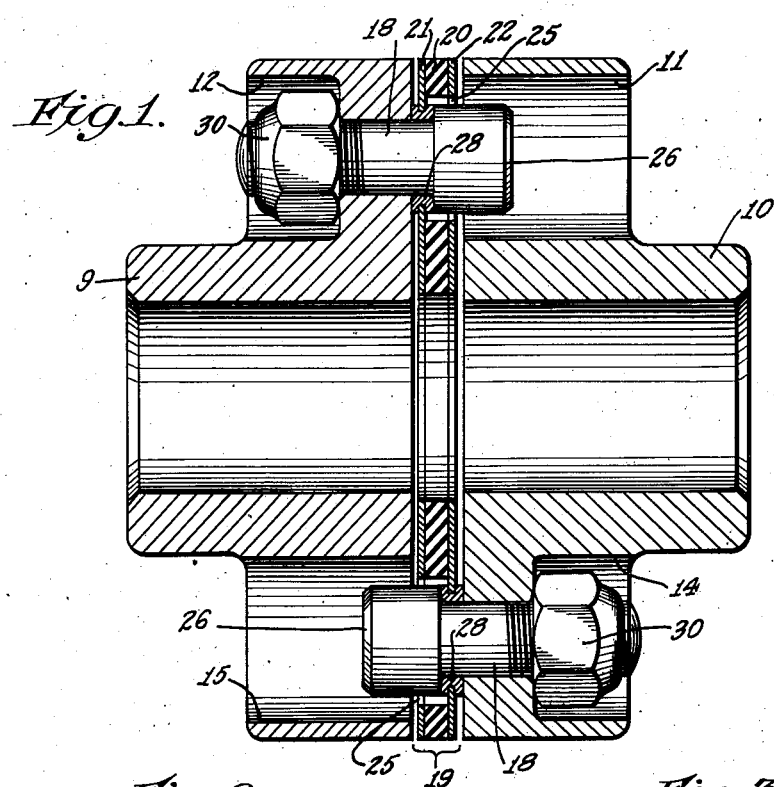
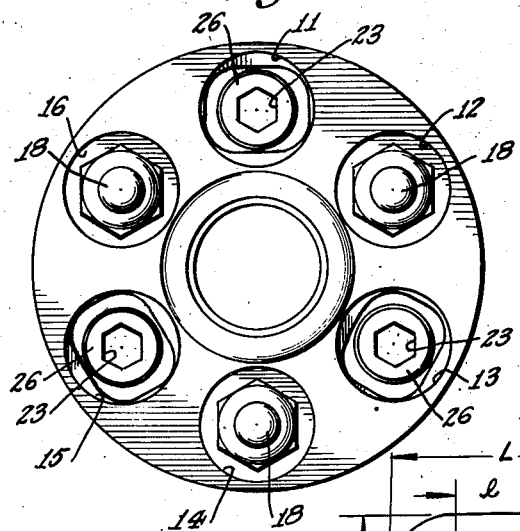
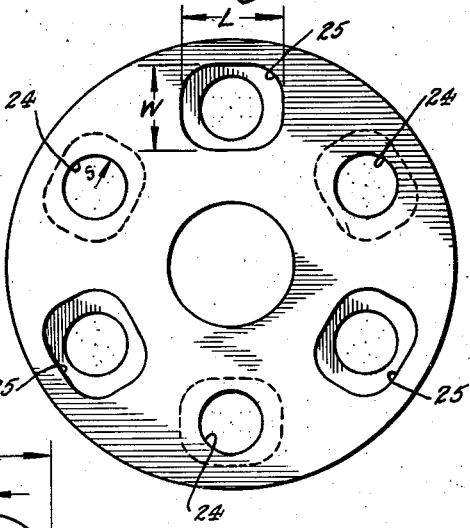
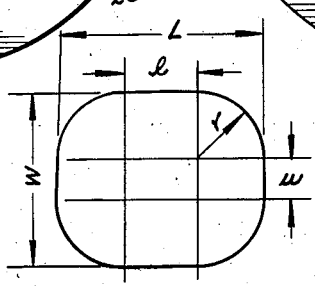
INVENTOR.
GUSTAVE FAST
BY
Edmund H O'Brien
ATTORNEY Feb. 28, 1950   G. FAST   2,499,093
COUPLING
Filed March 31, 1944   3 Sheets-Sheet 2
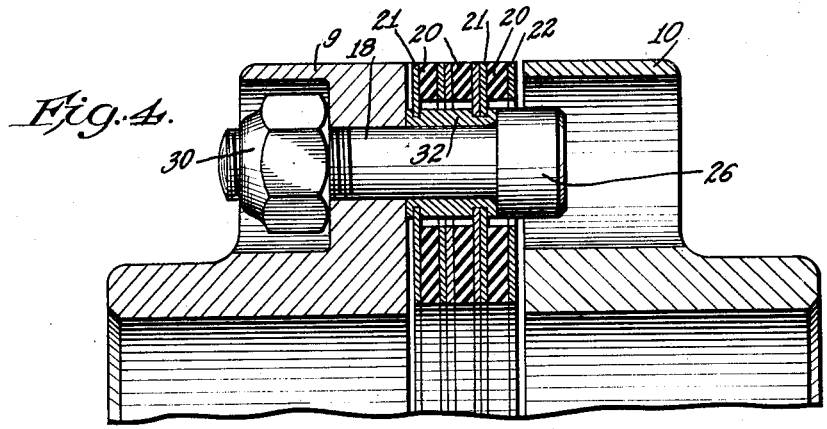
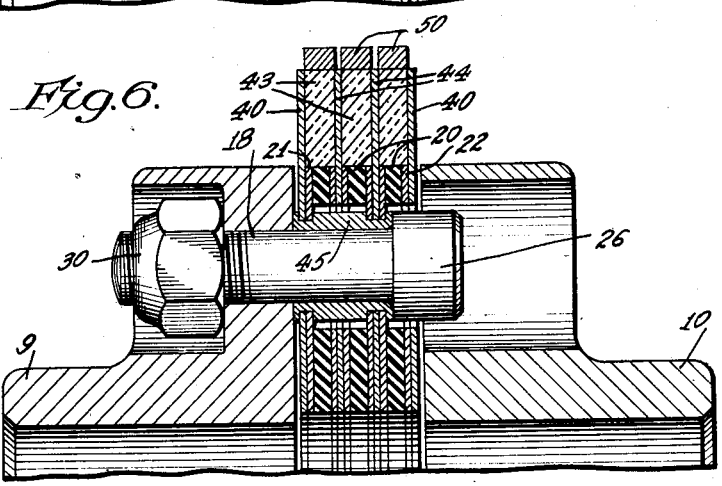
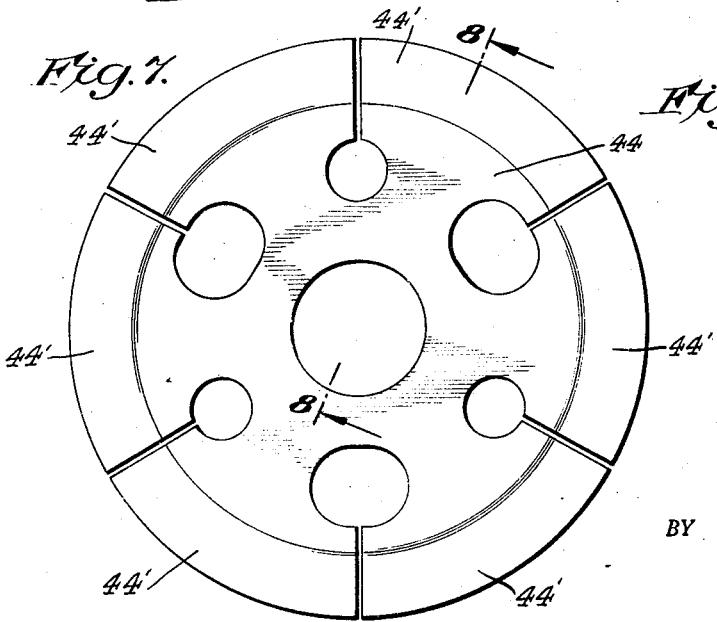
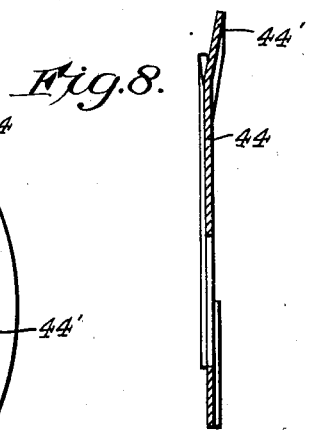
INVENTOR.
GUSTAVE FAST
BY
Edmund H. O'Brien
ATTORNEY Feb. 28, 1950        G. FAST        2,499,093
COUPLING Filed March 31, 1944        3 Sheets-Sheet 3

INVENTOR.
GUSTAVE FAST
BY
Edmund H. O'Brien
ATTORNEY

Patented Feb. 28, 1950

2,499,093

UNITED STATES PATENT OFFICE 2,499,093

COUPLING

Gustave Fast, Salisbury, Md.; Frederich W. C. Webb, administrator of said Gustave Fast, deceased, assignor to Christiane Ganna Fast Application March 31, 1944, Serial No. 528,834

2 Claims. (Cl. 64—13)

This invention relates to a new and improved coupling for the transference of torque between rotating shafts. More particularly, it relates to an improved form of coupling wherein a flexing member of rubber or similar elastic material is incorporated as part of the connection between the shafts.

In the coupling of rotating shafts it frequently happens that the two shafts to be coupled are not in accurate alignment. In fact they are rarely in precise alignment. Thus, the two shafts may be in misalignment to the extent that while their axes are parallel, they are offset in position. Frequently also greater or less angular misalignment may exist, the positioning of the two shafts in this form of misalignment being such that the shaft axes are not parallel. These types of misalignment, as well as other difficulties resulting from lack of accurate registration in the position of the shaft axes, are compensated for by the use of my shaft coupling provided with flexible means comprising rubber or similar elastic material.

As it is essential when utilizing flexible coupling members to provide means for limiting the stress in the flexible member, my coupling is so constructed that excessive torque is transmitted directly by metallic contact in the coupling. Also included are means whereby excessive vibrations may be dampened, and the natural period of vibration of the rotating coupled mass varied to prevent excessive vibrations, due to resonance, which might result in damage to or destruction of the coupling or connected machines. These advantages have not previously been realized in couplings now available in the art.

It is, accordingly, one of the objects of this invention to provide a flexible shaft coupling, including a flexing member of rubber or other suitable elastic material, whereby rotating shafts may be coupled, one to the other, for the transmission of power without difficulties incident to possible misalignment of the shafts. Another object of this invention is to utilize one or more unitary rubber sandwiches, i. e., elements in which a layer of rubber or other flexible material is positioned between two metallic supporting plates, the rubber core being stressed in shear, in the construction of improved flexible couplings. Still another object of this invention is the provision of means in the structure of the coupling itself whereby excessive torque is transmitted by direct metal to metal contact in the coupling, thus definitely limiting the stresses in the rubber or other elastic material employed in the unitary sandwich construction. A further object of this invention is to provide a vibration damping mechanism which may be employed in conjunction with the flexible shaft coupling, thereby making it possible to prevent resonance vibrations which, if not suppressed, might lead to injury or destruction of the mechanism and the interconnected machines. These and still further objects of my invention will be apparent from the ensuing disclosure of certain preferred embodiments thereof.

My invention is best illustrated with reference to the annexed drawings wherein:

Fig. 1 is a view in section, some parts being in elevation, showing one form of my improved shaft coupling utilizing a single unitary sandwich wherein a core of rubber or other elastic material constitutes the flexing member;

Fig. 2 is an end elevational view of the coupling shown in Fig. 1;

Fig. 3 is an elevational view of the rubber or flexible sandwich element which is shown in cross-section in Fig. 1, this view showing the arrangement of the holes or apertures in the metallic plates between which the layer of rubber or other elastic material is positioned;

Fig. 4 shows a modified form of the coupling construction utilizing three unitary sandwich members with elastic cores for the flexing member;

Figure 5:
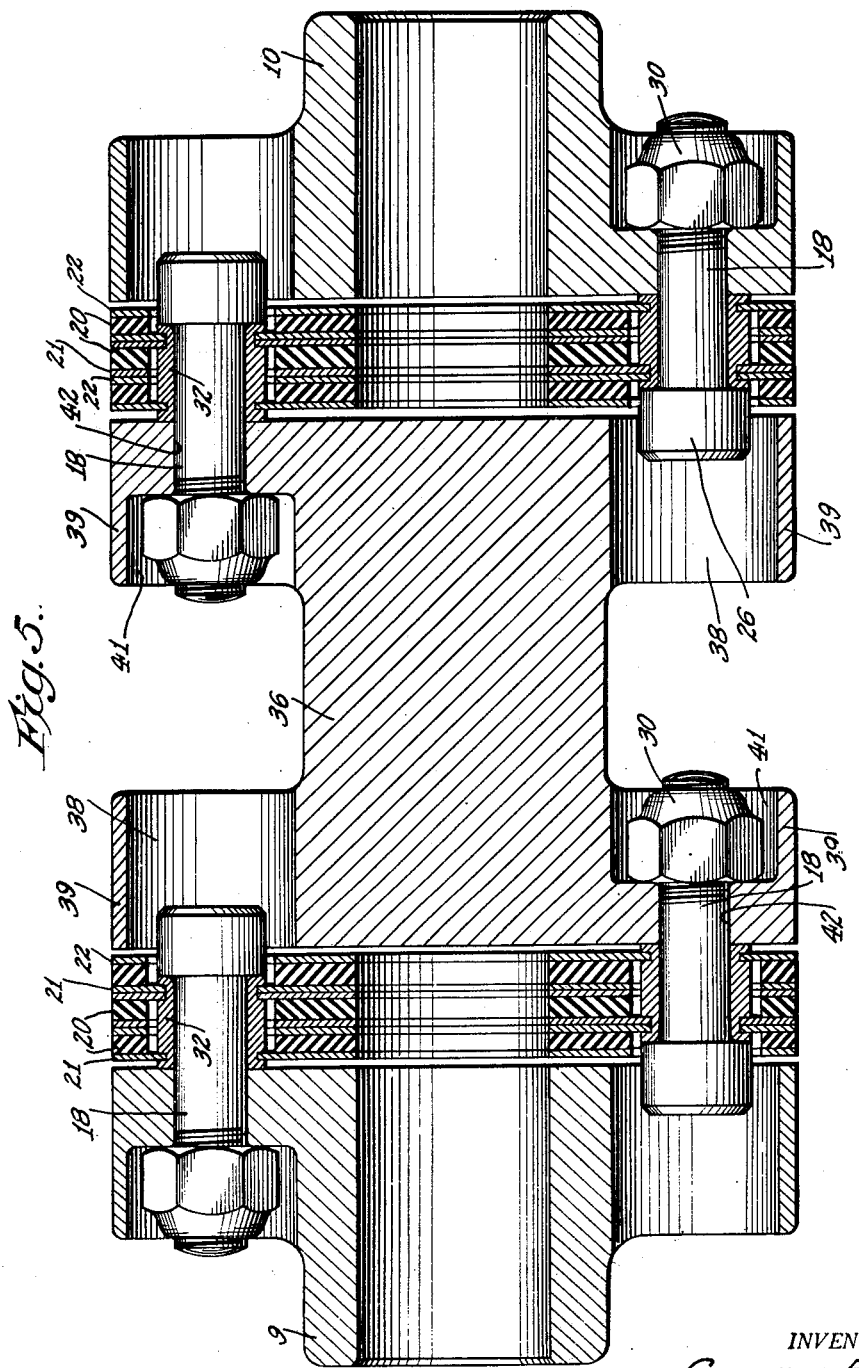

Fig. 5 is a cross-sectional view, some parts being in elevation, of a modified form of the coupling utilizing a spacer type of construction with three flexible sandwich members adjacent each of the connected shafts. This form of the coupling is especially useful where excessive misalignment is present, or where the connection must have relatively low torsional rigidity, thereby permitting a high degree of torsional yield;

Fig. 6 illustrates a modified form of the coupling, including damping means whereby critical vibrational conditions, and vibrations of dangerous or excessive amplitude in the coupling and connected shafts, may be suppressed;

Fig. 7 is a detail view in elevation showing one of the spring-like damper plates employed in conjunction with the construction shown in Fig. 6;

Fig. 8 is a cross-sectional view of part of one of the spring-like damper plates, taken on the line 8—8 of Fig. 7; and Fig. 9 is a detail view showing the shape of the oblong holes in the supporting plate members of the flexible sandwich elements.

Referring more particularly to the construction shown in Fig. 1, the numerals 9 and 10 represent identical coupling hubs, one being mounted on each end of the two shafts to be connected. These coupling hubs while identical in construction are positioned, as shown, in staggered relationship whereby drilled apertures of dissimilar type are in communication.

The coupling hubs 9 and 10 are provided with six circumferentially arranged holes or apertures 11, 12, 13, 14, 5, and 16. As shown, this series of apertures includes drilled holes of two types, one type, represented by the numerals 11, 13 and 15, of relatively large diameter, extending entirely through the hub member, while the other type, represented by the numerals 12, 14 and 16, includes a larger aperture extending part way into the coupling member followed by an aperture of smaller diameter for seating the bolts 18.

The sandwich of rubber or other flexible material is represented generally by the numeral 19 and includes the central core of rubber or other elastic material 20, interposed between and preferably vulcanized to, metal plates 21 and 22. These metal plates are provided with three identical equidistant holes, circular in shape, 24, through which the bolts 18 pass. They are also provided, as shown more clearly in Figs. 1 and 3, with three equidistantly spaced identical oblong holes 25 designed to receive the cap screw heads 26 of the bolts 18 and permit clearance for the cap screw head under misalignment conditions and torsional yield. The heads do not fill these holes, but are a short distance away from the edges of the plates in which the holes are positioned. The oblong holes 25 are shown in detail in Fig. 9.

In assembling the coupling construction as shown in Fig. 1, the coupling hubs 9 and 10 are splined, keyed, or otherwise suitably secured to the shafts to be connected, the apertures in the respective hubs being arranged in opposite relation to each other. There is then positioned between the coupling hubs 9 and 10 the flexible sandwich member 19. This flexible sandwich member is constructed by interposing the rubber or other elastic layer 20 between plates 21 and 22, the rubber layer being secured to these plates preferably by vulcanizing. The two plates 21 and 22 are so positioned, one with respect to the other, that passages therebetween and through the rubber layer 20 are provided wherein one plate has a circular aperture of type 24 and the other oblong aperture 25. Through these apertures threaded bolts 18 with cap screw heads 26 are passed, the cap screw head in each case, being positioned in the larger or oblong opening 25. As shown, the direction of the bolts is varied, the bolts being positioned alternately in opposite directions around the circumference of the coupling.

In order to distribute the pressure and reduce the wear between the relatively thin plates 21 and 22 and the coupling bolt 18, a nipple or thimble 28 is inserted in the plate members at each of the apertures 24, this nipple or thimble being spun or flanged over as shown. In this way the main body of the sandwich with flexible core 20 is spaced away from the coupling hub member on either side, thereby permitting efficient air cooling of the flexible sandwich, which may develop considerable heat due to the damping characteristic (internal friction) of the flexible core when subjected to rapidly varying stresses, such as would occur, for example, under severe torsional vibration conditions or under constant flexing due to misalignment of the shafts. The whole assembly is then secured by tightly screwing the nuts 30 on the threaded bolts 18. To assist in screwing the nuts in place on the bolts, apertures 23 are provided in the bolt heads 26 in which a holding tool may be placed.

It is apparent that the metallic plates 21 and 22 supporting the flexible core 20 of the rubber sandwich are mounted in rotated relation to each other. It is also apparent that rubber cores of any desired thicknesses may be provided. In this way a coupling having any desired torque capacity or torsional yield characteristics may be secured.

It is important when utilizing rubber or other elastic material for transmitting the torque, as in the construction shown, that the stresses be limited within fixed amounts. The clearance between the cap screw head 26 of the bolt 18 and the oblong holes 25 in the plates 21 and 22 is made such as to limit the possible relative angular movement of the coupling hubs 9 and 10, thus limiting the stress to which the rubber core of the sandwich may be subjected. Should the torque become greater than that corresponding to the permissible amount of stress and angular movement the bolt head 26 will engage the edge portion of the hole, the excess torque load being then transmitted by direct metallic contact between the bolt head and the plate. In this way the maximum stress to which the rubber core of the flexible sandwich may be subjected is definitely limited.

It is also apparent that the coupling is arranged in such a manner as to accommodate all types of misalignment between the shafts which are interconnected, whether this misalignment is angular, or of that type in which the shafts are parallel but offset from each other in position. The rubber sandwich is, in effect, a piece of short rubber shafting provided with positive means for limiting the torque. It is also apparent that should the rubber core 20 of the unitary sandwich member 19 become damaged or worn out a new one can be quickly inserted in place without disturbing coupling hubs 9 and 10, which remain firmly connected to the shafts.

Fig. 4 shows a modified form of the construction utilizing a triple shear construction (three unitary sandwich members). This coupling has three times the torque capacity of the single shear coupling shown in Fig. 1. This construction is equivalent, in effect, to providing three short pieces of rubber shafting in parallel between the rotating shafts to be coupled.

In this construction the coupling heads are again shown by the numerals 9 and 10, and are identical with those previously described. The bolts 18 provided with cap screw heads 26 are positioned, as in the construction shown in Fig. 1, in alternate relationship around the circumference of the coupling hubs. The triple-shear member comprises the three flexible sandwich members shown, which include cores of rubber or other flexible material 20 interspaced between metallic plates 21 and 22, to which the rubber cores are vulcanized or otherwise suitably secured. These individual sandwich members are identical with the form previously described, the only major difference from the construction shown in Fig. 1 being that three unitary sandwich members are used in place of one. It is obvious that any number of these sandwich members could be utilized, the number selected being such as to provide suitable torque capacity, permit the desired amount of torsional yield, and allow for any degree of misalignment between the rotating shafts.

In the construction of Fig. 4 in place of the reinforcing nipple or thimble 28 of Fig. 1, there are provided ferrules 32, the ends of the ferrules being spun or flanged over, as shown, to distribute the pressure between the relatively thin plates of the sandwich members and the coupling bolts 18. It is evident that since the diameter of each ferrule is the same as that of bolt head 26, both will act as limit stops in this construction, should the stress exceed the permissible amount and the bolt head be forced into direct metallic contact with the plates by movement in oblong hole 25. The ferrule also serves to space the triple-shear sandwich construction away from the coupling hubs, thereby permitting air to circulate and cool the sandwich construction.

In Fig. 5 there is shown a modified form of this construction utilizing two triple-shear sandwich members, one positioned adjacent each coupling hub 9 and 10. This construction includes a spool or spacer member 36 which may be of any desired length to fit the conditions of a particular installation. As shown, this spacer member is provided with drilled apertures for bolts 18, these apertures being of two types. In one type, represented generally by the numeral 38, the aperture is of large diameter and extends entirely through the flange 39 of the spacer member 36. In the other the aperture, in flange 39, represented generally by the numeral 41, includes a portion of large diameter in communication with a portion of smaller diameter, 42, for seating the bolt 18.

In this construction the triple-shear flexible sandwich element adjacent each of the coupling hubs 9 and 10 is identical with that shown in Fig. 4. Each is made up of three individual sandwiches comprising rubber cores 20 supported between plates 21 and 22. Between the two coupling hubs 9 and 10 the spacing member 36 is positioned, and the bolts inserted through each set of holes, as shown, in reversed relationship. As in the construction shown in Fig. 4, a flanged-over ferrule 32 is provided to distribute the stresses between the thin metallic plates 21 and 22 and the coupling bolts 18. This form of construction is particularly useful where excessive misalignment of the shafts may be present. It provides a coupling of high torsional yield, i. e., low torsional rigidity.

While it is possible to compound rubber compositions having more or less internal friction, there is a practical limit to the amount of internal friction possible. It is generally desirable, for reasons of durability, to have rubber cores for the sandwich members which have the least internal friction possible. In many case it is desirable to provide a construction of greater internal friction, this providing for greater damping of impressed vibrations than is possible when utilizing rubber or other similar elastic material alone for the cores of the flexible sandwich members. For such installations the construction shown in Fig. 6 is especially suitable, this form of coupling including friction discs developing internal friction which serves to dampen vibrations impressed on the system.

In this figure the numerals 9 and 10 indicate the coupling hubs identical with those shown in the other constructions. The bolt 18 is provided with nut 30 and cap screw head 26, as in the other coupling constructions. Elements 40 are two plain damper plates which are assembled on the outside of the triple-shear sandwich members which include, as in the other embodiments of my invention, rubber cores 20 and outside metal plates 21 and 22. The numerals 44 denote spring-like damper plates, one of these elements being shown in detail in Figs. 7 and 8. In use two or more of these spring-like damper elements may be joined together to give an element capable of exerting any desired pressure. Between these spring-like damper plates 44, and between them and the exterior plain damper plates 40, there are positioned three identical friction discs 43. These discs are preferably formed of a material having a high coefficient of friction, such, for example, as asbestos or similar material. The spring-like damper plates 44 are so arranged, being joined to alternate flanged ferrules 45, that there is relative angular movement between adjacent plates when the coupling is subjected to change in torque. Segments 44' of members 44 are bent or twisted out of their normal planes to provide spring pressure. As shown, the three friction discs 43 are positioned on the outer circumference of the rubber sandwich members 20.

There is also provided, as in other embodiments, a metallic ferrule 45 similar to metallic ferrule 32, and this is spun or flanged over the plates 21, 22 and 40, thus serving to transmit pressure between the relatively thin plates 21, 22, 40 and 44. The whole assembly is clamped between the heads of the coupling bolts 18 and the end faces of the hubs. Arranged circumferentially outside the friction discs 43 are the damper shroud rings 50, which are preferably formed of steel. One or more of these damper shroud rings may be employed. These rings 50 are permanently connected to the friction discs 43 by being pressed onto their peripheries. During severe vibrations rings 50 and discs 43 will slip together in relation to plates 40 and 44, due to inertia. This is because the inertia moment due to rapid changes in angular velocity (the angular acceleration) is greater than the frictional moment between the plates. The assembly, thus constituted, provides means for varying both the torsional rigidity and the moment of inertia of the rotating mass, whereby it is possible to prevent critical or destructive vibrations caused by resonance, i. e., the frequency of the impressed vibrations being the same as the natural frequency of vibration of the coupling and its associated parts.

During critical vibration conditions, which occur when the impressed periodic vibration has the same frequency as the natural frequency of the connected machine, the damping elements described are very effective in preventing these vibrations from reaching excessive amplitude. The frequency of the impressed vibration is fixed by the nature of the machine, and, as a rule, little can be done to change it. In order to space the frequencies as far apart as possible, and thus prevent vibrations of excessive amplitude, it is desirable to have some means of modifying the natural period of vibration of the connected member.

The natural frequency of vibration of the machine with which power transmission connections are made by means of the coupling shown, as for example, an electrical generator, together with the coupling itself, is defined by the formula:

$$F = \frac{1}{2\pi}\sqrt{\frac{C}{J}}$$

In this formula F is the frequency in vibrations per second, C the torsional rigidity in torque per radian, and J the moment of inertia of the rotating mass. It is apparent that by varying the values of C and J it is possible to vary the natural or free vibrations of the connected machines in such a manner as to avoid resonance conditions which might result in vibrations of excessive or dangerous amplitude.

By the use of the rubber-in-shear couplings illustrated, employing unitary rubber sandwiches or similar flexible material interposed between supporting plates, it is possible to change the value of C, the torsional rigidity, and thus avoid critical vibrational conditions. One or more of the unitary rubber sandwiches may be assembled in a number of ways to provide any desired torsional rigidity. Thus, the flexible core members interposed between supporting rigid plates may be connected in parallel as shown in Fig. 4, or they may be connected in series to halve the torsional rigidity as shown in Fig. 5. Both the number of individual flexible sandwich members employed, and the thickness of the elastic core, as well as the modulus of rigidity of the rubber composition, may be varied, as desired, in order to obtain torsional rigidity of any desired value such as to avoid angular displacement of dangerous amplitude.

It is also possible to change the value of J, the moment of inertia of the rotating mass, by the use of the construction shown in Fig. 6, where damper shroud rings 50 act as ring-like flywheels. When the vibrations of the coupling become of dangerous amplitude these damper shroud rings 50, together with the friction discs 43, will slip, due to their inertia, and become temporarily detached from the main mass of the system. This results in changing the moment of inertia of the rotating mass, thereby changing the natural frequency of the system to prevent resonance conditions which might give rise to vibrations of dangerous amplitude. It is apparent that by including damper shroud rings 50 the rotating coupling system will, under severe vibrational conditions, go out of step, i. e., become disharmonized, thus preventing resonance vibrations. Resonance conditions are also avoided by combining flexible sandwich elements in such a way as to produce a coupling having any desired torsional rigidity, thus changing the value of C, the torsional rigidity, in the mathematical expression defining the frequency.

It is obvious that by the use of the oblong holes 25 in the supporting plates 21 and 22 of flexible sandwich elements 19 the torque capacity of the sandwich is reduced by the least amount possible for a certain torsional yield and allowance for a given amount of maximum misalignment of the coupled shafts. The irregular oblong shape of these holes in the supporting plates of the flexible sandwich construction does not increase the cost of manufacture, as the plates are inexpensively punched in dies.

A preferred shape for these oblong holes 25 is shown in Fig. 9, wherein representative dimensions are given. It will be noted that the dimension W is the overall width of the oblong hole, measured in the direction shown in Fig. 3, while L is the overall length, measured in a direction at right angles to W. The dimensions $l$ and $w$, and the curve of radius $r$, joining the flat portions denoted by $l$ and $w$, are also marked on Fig. 9.

Representative values in inches for these dimensions are given in the following table:

|   | L | W | $l$ | $w$ | $r$ |
|---|---|---|---|---|---|
| A | 0.690 | 0.625 | 0.127 | 0.063 | 0.281 |
| B | 0.910 | 0.8125 | 0.160 | 0.063 | 0.375 |
| C | 1.068 | 0.9375 | 0.193 | 0.063 | 0.4375 |
| D | 1.233 | 1.094 | 0.233 | 0.094 | 0.500 |
| E | 1.413 | 1.219 | 0.288 | 0.094 | 0.5625 |
| F | 1.665 | 1.438 | 0.332 | 0.125 | 0.656 |
| G | 2.182 | 1.875 | 0.432 | 0.125 | 0.875 |
| H | 2.524 | 2.188 | 0.524 | 0.188 | 1.000 |

Generally the radii S of the circular holes 24 in supporting plates 21 and 22 will vary, for oblong holes having the dimensions noted, (i. e., values of L ranging from 0.690 inch to 2.524 inches), from 0.2345 inch to 0.875 inch.

While the maximum shearing stresses in the elastic cores are definitely limited by the construction described, the torque, under conditions of considerable shaft misalignment or excessive torque conditions being transmitted by direct metal to metal contact of the bolt heads 26 in the oblong apertures 25, it is obvious that should a rubber sandwich element fail, or the elastic core become damaged or worn out, it is readily possible to insert a new element quickly without disturbing the coupling hubs on the connected shafts.

The elastic core acts to dampen vibrations of the coupling during changing torque conditions, the damping action being caused by internal friction in the rubber. For greater damping action friction discs 43 may be employed to provide greater friction, as in the construction shown in Fig. 6. As there is a limit to the extent to which rubber compositions can be compounded to give high internal friction and as, in general, rubber having the least internal friction is preferred for forming elastic cores 20, it is frequently desirable to utilize a modification wherein discs of material having a high coefficient of friction are included, especially where considerable damping action in the coupling is important.

Various changes in, or modifications of, my invention, certain preferred embodiments of which are herein disclosed, may be made which would fall within the purview thereof. Accordingly, it is my intention that its scope is to be construed in accordance with the appended claims.

I claim:

1. A flexible shaft coupling adapted for coupling rotating shafts which, to a greater or less extent, may be out of alignment, which comprises: a plurality of coupling hubs secured on said shafts to be coupled; flexible sandwich means positioned between said coupling hubs, said flexible sandwich means including a core of elastic material interposed between supporting plate members, said core of elastic material and said plate members being apertured for the passage of coupling bolts with the enlarged head portions thereof positioned in said apertures, said coupling bolts securing said coupling hubs and said flexible sandwich means together in interconnected relationship; a plurality of coupling bolts with enlarged head portions, said enlarged head portions being adapted to transmit excessive torque between said coupling bolts and said metallic plates by direct metal-to-metal contact between said enlarged head and the portions of said plates adjacent said apertures, torque less than said excessive torque being transmitted through said elastic core members; and vibration damping means comprising relatively shiftable elements surrounding said flexible sandwich means and retained thereby for damping excessive vibrations of said coupling.

2. A flexible shaft coupling adapted for coupling rotating shafts which, to a greater or less extent, may be out of alignment, which comprises: a plurality of coupling hubs secured on the shafts to be coupled; flexible sandwich elements positioned between said coupling hubs, said flexible sandwich elements including a core of elastic material interposed between supporting plate members, said core of elastic material and said plate members being apertured for the passage of coupling bolts; a plurality of coupling bolts positioned in said apertures, said coupling bolts being adapted, under conditions of excessive torque, to transmit said torque directly by metal-to-metal contact with said supporting plate members, said torque at other times being transmitted through said elastic core members; a plurality of plates positioned between said coupling hubs and between said flexible sandwich elements; and a plurality of friction members positioned between said last named plates, said friction members and said plates coacting by friction therebetween to dampen vibrations of excessive amplitude in said coupling.

GUSTAVE FAST.

REFERENCES CITED

The following references are of record in the file of this patent:

UNITED STATES PATENTS

| Number | Name | Date |
|---|---|---|
| 1,316,563 | Edwards | Sept. 23, 1919 |
| 1,376,504 | Behn | May 3, 1921 |
| 1,682,721 | Bijur | Aug. 28, 1928 |
| 1,693,765 | Parsons et al. | Dec. 4, 1928 |
| 2,067,109 | Viale et al. | Jan. 5, 1937 |
| 2,101,078 | Lord et al. | Dec. 7, 1937 |
| 2,332,068 | Fast | Oct. 19, 1943 |

FOREIGN PATENTS

| Number | Country | Date |
|---|---|---|
| 486,917 | Great Britain | June 7, 1938 |
| 494,978 | Great Britain | Nov. 4, 1938 |
| 693,455 | Germany | July 10, 1940 |
| 700,247 | Germany | Dec. 16, 1940 |